(12) United States Patent
Takahashi

(10) Patent No.: US 11,262,202 B2
(45) Date of Patent: Mar. 1, 2022

(54) ROUTE CANDIDATE SETTING SYSTEM AND ROUTE CANDIDATE SETTING METHOD

(71) Applicant: MAZDA MOTOR CORPORATION, Hiroshima (JP)

(72) Inventor: Hideki Takahashi, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 315 days.

(21) Appl. No.: 16/694,902

(22) Filed: Nov. 25, 2019

(65) Prior Publication Data

US 2020/0173794 A1    Jun. 4, 2020

(30) Foreign Application Priority Data

Nov. 30, 2018 (JP) .............................. JP2018-224934

(51) Int. Cl.
*G01C 21/34* (2006.01)

(52) U.S. Cl.
CPC ................................ *G01C 21/3415* (2013.01)

(58) Field of Classification Search
CPC ..... G01C 21/3415; B62D 6/002; G08G 1/165
USPC ................... 701/411; 340/435, 988; 342/147
See application file for complete search history.

(56) References Cited

U.S. PATENT DOCUMENTS

| | | | | |
|---|---|---|---|---|
| 5,818,356 A * | 10/1998 | Schuessler | ....... | G08G 1/096861 340/995.12 |
| 6,545,288 B1 * | 4/2003 | Ratchkov | ............. | G06F 30/394 257/12 |
| 7,069,531 B1 * | 6/2006 | Teig | ........................ | G06F 30/18 716/126 |
| 2013/0054128 A1 * | 2/2013 | Moshchuk | ............ | B60W 10/18 701/301 |
| 2014/0244114 A1 | 8/2014 | Matsubara | | |

(Continued)

FOREIGN PATENT DOCUMENTS

| CN | 104486715 A | * | 4/2015 | | |
|---|---|---|---|---|---|
| CN | 104554258 A | * | 4/2015 | ........... | G01S 7/4808 |

(Continued)

OTHER PUBLICATIONS

Shumin et al., "Traffic Obstacles Comprehensive Identification Using Shape Descriptors in Video," 2017, vol. 2, Publisher: IEEE.*

(Continued)

*Primary Examiner* — Tuan C To
(74) *Attorney, Agent, or Firm* — Studebaker & Brackett PC

(57) ABSTRACT

An ECU of a driving support system as a route candidate setting system is configured to provide a first curved line represented by a first function having x coordinate as a variable and y coordinate and a second curved line represented by a second function having x coordinate as a variable and y coordinate and having a lower degree than the first function, and set the first and second curved lines as traveling-route candidate RC. In a case where an obstacle is detected by a camera and a radar, the ECU is configured not to provide the first curved line having its terminal point corresponding to a grid point Gn located on a forward side, in an advancing direction of a vehicle, of the obstacle and the second curved line having its start point corresponding to this grid point Gn.

5 Claims, 5 Drawing Sheets

(56) References Cited

U.S. PATENT DOCUMENTS

| | | | | |
|---|---|---|---|---|
| 2015/0025789 A1* | 1/2015 | Einecke | .................. | G08G 1/20 |
| | | | | 701/408 |
| 2015/0120138 A1* | 4/2015 | Zeng | ..................... | G01S 7/4808 |
| | | | | 701/41 |
| 2015/0156578 A1* | 6/2015 | Alexandridis | ......... | H04R 3/005 |
| | | | | 381/92 |
| 2016/0253566 A1* | 9/2016 | Stein | ......................... | G06T 7/13 |
| | | | | 348/148 |
| 2018/0273026 A1* | 9/2018 | Oyama | ................. | B60W 10/20 |
| 2020/0139967 A1* | 5/2020 | Beller | ............. | B60W 60/00272 |

FOREIGN PATENT DOCUMENTS

| | | | | |
|---|---|---|---|---|
| CN | 104554272 A | * | 4/2015 | ........... G01S 13/931 |
| WO | 2013/051081 A1 | | 4/2013 | |

OTHER PUBLICATIONS

Chengxiong et al., Road Curvature Estimation using a New Lane Detection Method, 2017, Publisher: IEEE.*
Ya-Wen et al., "Object Recognition System Design in Regions of Interest based on AdaBoost Algorithm," 2017, Publisher: IEEE.*

\* cited by examiner

ROUTE CANDIDATE SETTING SYSTEM AND ROUTE CANDIDATE SETTING METHOD

BACKGROUND OF THE INVENTION

The present invention relates to a route candidate setting system and a route candidate setting method.

An algorithm used for setting candidates of a traveling route of a vehicle (i.e., candidates of a target route for vehicle's actual traveling), such as the potential method, the spline interpolation function, A-star (A*), RRT, or the State Lattice method, is known. A driving support system using this algorithm has been proposed as well.

In the State Lattice method, many grid points are set on a traveling road of the vehicle and candidates of the traveling route of the vehicle are set for these grid points. These route candidates are respectively evaluated in terms of a route cost which relates to an obstacle-avoidance risk and the like. PCT WO 2013/051081 (its counterpart US Patent Application Publication No. 2014/0244114 A1), for example, discloses a driving support (assistance) system in which plural route candidates are set on a grid map and the best route is selected from these route candidates based on a traveling cost.

The State Lattice method using many grid points is useful in setting various route candidates. However, a computing load for this setting is so large that further improvements have been required in application to a situation where quicker computation is necessary in a case of avoiding an obstacle or the like.

SUMMARY OF THE INVENTION

The present invention has been devised in view of the above-described matter, and an object of the present invention is to provide a route candidate setting system and a route candidate setting method which can properly reduce the computing load, setting the various route candidates.

The present invention is a route candidate setting system for setting candidates of a traveling route of a vehicle, comprising a traveling-road information acquisition device to acquire traveling-road information on a traveling road of the vehicle, an obstacle information acquisition device to acquire obstacle information on an obstacle existing on the traveling road, and a computing device to execute computation for setting the candidates of the traveling route of the vehicle based on the traveling-road information acquired by the traveling-road information acquisition device and the obstacle information acquired by obstacle information acquisition device, wherein the computing device is configured, when it is defined that a direction in which the traveling road extends is an x direction and a width direction of the traveling road is a y direction, to set plural grid points arranged in a grid shape on the traveling road, provide a first curved line and a second curved line, the first curved line being configured to extend from a start point thereof which corresponds to a position of the vehicle during execution of the computation by the computing device up to a terminal point thereof which corresponds to a grid point located on a forward side in an advancing direction of the vehicle and be represented by a first function having x coordinate as a variable and y coordinate, the second curved line being configured to extend from a start point thereof which corresponds to the terminal point of the first curved line up to a terminal point thereof which corresponds to another grid point located on the forward side, in the advancing direction of the vehicle, of the start point thereof and be represented by a second function having x coordinate as a variable and y coordinate, wherein a degree of the second function is lower than that of the first function, and set the first curved line and the second curved line as the candidate of the traveling route of the vehicle, wherein in a case where the obstacle is detected by the obstacle information acquisition device, the computing device is configured not to provide the first curved line having the terminal point which corresponds to the grid point located on the forward side, in the advancing direction of the vehicle, of the obstacle and the second curved line having the start point which corresponds to the grid point.

According to the present invention, the computing device sets the first curved line as the route candidate for a close range which is positioned relatively closely to the vehicle and sets the second curved line as the route candidate for a far range which is far from the close range. While the first curved line represented by the first function having the relatively high degree can set the precise route candidate which is capable of meeting many requirements, the computing load in providing the first curved line is large. Meanwhile, the second curved line represented by the second function having the relatively low degree does not cope with many requirements like the first curved line, but the computing load in providing the second curved line is properly small. The computing device can properly reduce the computing load in setting the route candidate by setting the second curved line as part of the route candidate.

Herein, in a case where an obstacle exists on the traveling road of the vehicle, it is preferable that the route candidate for a range from the vehicle to the obstacle be set precisely by the first curved line so that various requirements, such as vehicle's collision avoidance with the obstacle or less discomfort that passengers may feel in operation for this vehicle's collision avoidance, can be met. Meanwhile, the route candidate for a range which is far from the obstacle does not require such precise setting like the route candidate for the range from the vehicle to the obstacle.

Thus, according to the present invention, in the case where the obstacle is detected by the obstacle information acquisition device, the computing device does not provide the first curved line having the terminal point which corresponds to the grid point located on the forward side, in the advancing direction of the vehicle, of the obstacle and the second curved line having the start point which corresponds to this grid point. Thereby, the route candidate setting system of the present invention can properly reduce the computing load in setting the route candidates, meeting the requirements, such as vehicle's collision avoidance with the obstacle or less discomfort that passengers may feel in operation for this vehicle's collision avoidance.

In an embodiment of the present invention, the computing device is configured to provide only the first curved line having the terminal point which corresponds to the grid point located in the vicinity of the obstacle and the second curved line having the start point which corresponds to this grid point in the case where the obstacle is detected by the obstacle information acquisition device.

The route candidate setting system of this embodiment can more properly reduce the computing load in setting the route candidates, meeting the requirements, such as vehicle's collision avoidance with the obstacle or less discomfort that passengers may feel in operation for this vehicle's collision avoidance.

In another embodiment of the present invention, the first function is a quintic function having x coordinate as a variable.

According to this embodiment, relational expressions correlated with a yaw angle, a yaw angle speed, and a yaw angle acceleration of the vehicle can be respectively obtained by first-order-third-order differentiations of the quintic function with the x coordinate. The yaw angle, the yaw angle speed, and the yaw angle acceleration of the vehicle can be evaluated by these relational expressions. Consequently, the route candidate setting system of this embodiment can set the route candidates to reduce the discomfort that passengers may feel, considering behavior of the vehicle in a yaw direction.

In another embodiment of the present invention, the second function is a cubic function having x coordinate as a variable.

According to this embodiment, relational expressions correlated with the yaw angle and the yaw angle speed of the vehicle can be respectively obtained by first-order and second-order differentiations of the cubic function with the x coordinate. The yaw angle and the yaw angle speed of the vehicle can be evaluated by these relational expressions. Consequently, the route candidate setting system of this embodiment can set the route candidates to reduce the discomfort that passengers may feel, considering the behavior of the vehicle in the yaw direction.

Further, the present invention is a route candidate setting method for setting candidates of a traveling route of a vehicle, comprising steps of acquiring traveling-road information on a traveling road of the vehicle, acquiring obstacle information on an obstacle existing on the traveling road, and executing computation for setting the candidates of the traveling route of the vehicle based on the traveling-road information and the obstacle information, wherein the step of executing the computation includes, when it is defined that a direction in which the traveling road extends is an x direction and a width direction of the traveling road is a y direction, steps of setting plural grid points on the traveling road, providing a first curved line and a second curved line, the first curved line being configured to extend from a start point thereof which corresponds to a position of the vehicle during execution of the computation up to a terminal point thereof which corresponds to a grid point located on a forward side in an advancing direction of the vehicle and be represented by a first function having x coordinate as a variable and y coordinate, the second curved line being configured to extend from a start point thereof which corresponds to the terminal point of the first curved line up to a terminal point thereof which corresponds to another grid point located on the forward side, in the advancing direction of the vehicle, of the start point thereof and be represented by a second function having x coordinate as a variable and y coordinate, wherein a degree of the second function is lower than that of the first function, and setting the first curved line and the second curved line as the candidate of the traveling route of the vehicle, wherein in a case where the obstacle is detected, the step of executing the computation is configured not to provide the first curved line having the terminal point which corresponds to the grid point located on the forward side, in the advancing direction of the vehicle, of the obstacle and the second curved line having the start point which corresponds to the grid point.

Other features, aspects, and advantages of the present invention will become apparent from the following description which refers to the accompanying drawings.

DETAILED DESCRIPTION OF THE INVENTION

Figure 1:
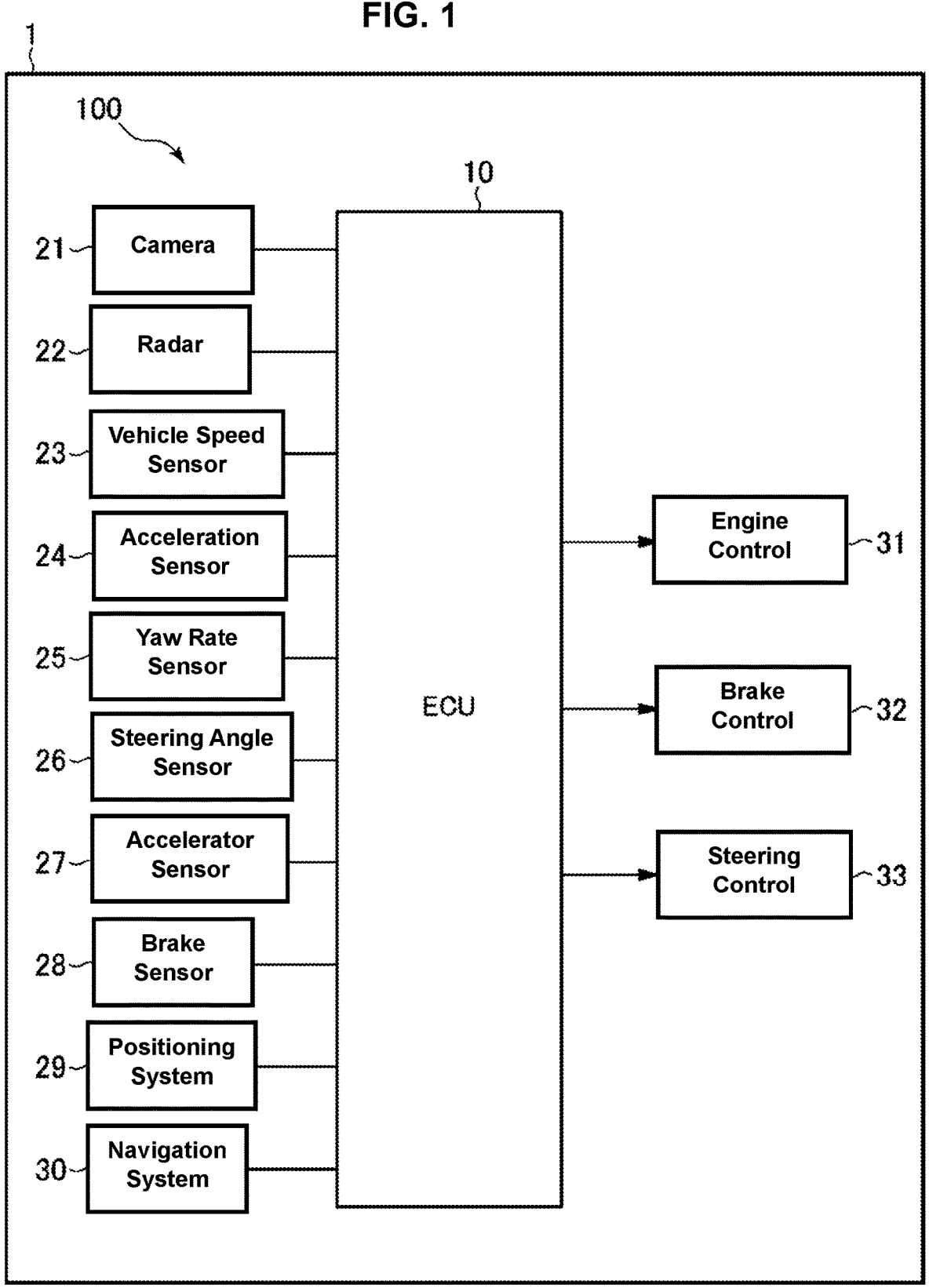
FIG. 1 is a block diagram of a driving support system according to an embodiment.

Hereafter, an embodiment of the present invention will be described referring to the accompanying drawings. In the figures, the same constitutional elements have the same reference characters attached, and duplicate descriptions for those are omitted here.

Figure 2:
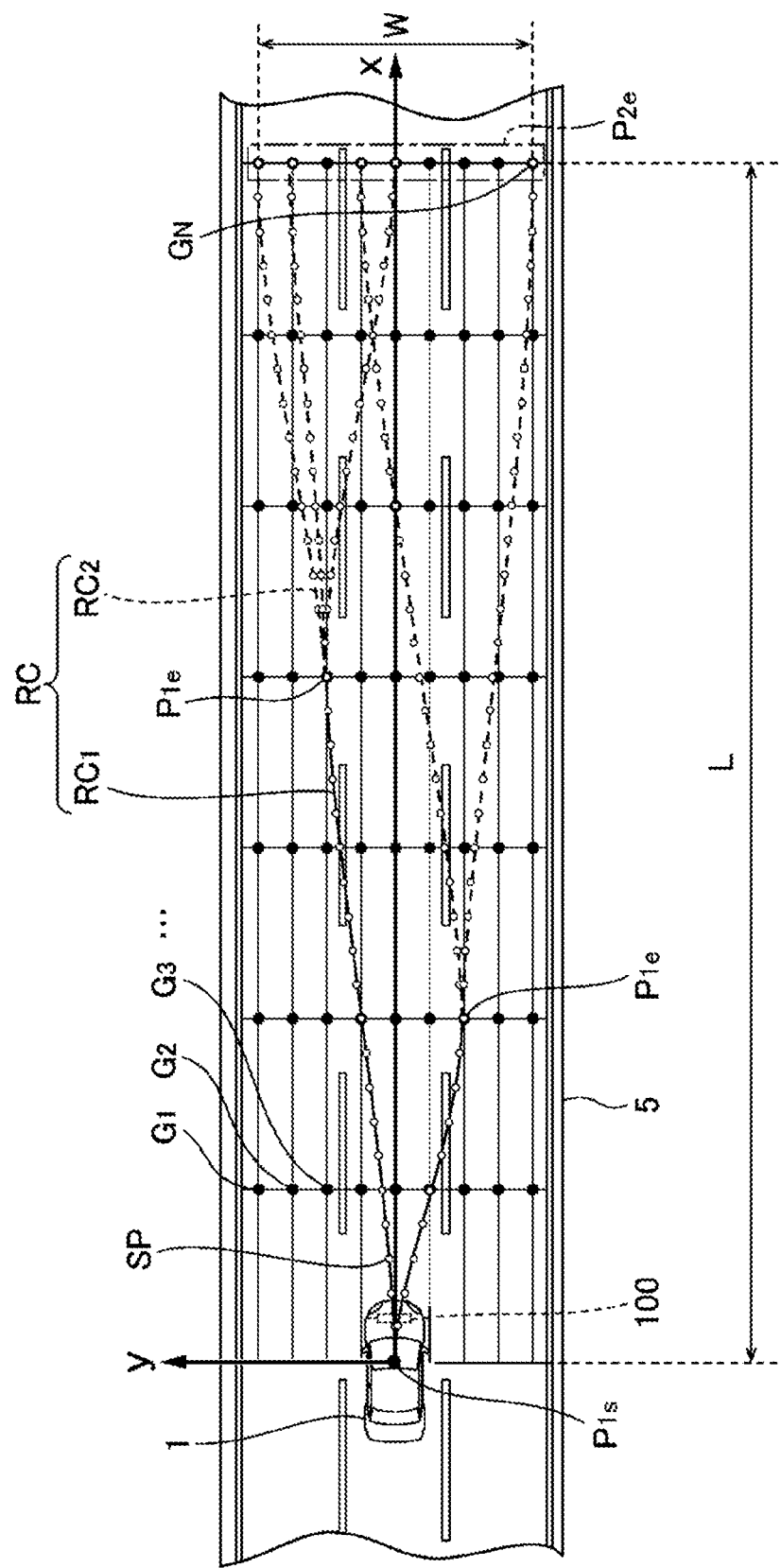
FIG. 2 is an explanatory diagram of route candidates.

Referring to FIGS. 1 and 2, an outline of a driving support system 100 as an example of a route candidate setting system according to the present invention will be described. FIG. 1 is a block diagram of the driving support system 100, and FIG. 2 is an explanatory diagram of route candidates RC.

The driving support system 100 is installed at a vehicle 1 and provides a driving support control to make the vehicle 1 travel along a target route. As shown in FIG. 1, the driving support system 100 comprises an ECU (electric control device) 10, plural sensors, and plural control systems. The plural sensors include a camera 21, a radar 22, and other sensors to detect behavior of the vehicle 1 and driving operations by a passenger, such as a vehicle speed sensor 23, an acceleration sensor 24, a yaw rate sensor 25, a steering angle sensor 26, an accelerator sensor 27, and a brake sensor 28. Further, a positioning system 29 to detect a position of the vehicle 1 and a navigation system 30 are included. The plural control systems include an engine control system 31, a brake control system 32, and a steering control system 33.

A surrounding sonar to measure a distance between the vehicle 1 and a surrounding structure and a position of the surrounding structure, a corner radar to measure approach of the surrounding structure to four corner portions of the vehicle 1, or an inner camera to pick up an image of a cabin inside of the vehicle 1 may be included as well.

The ECU 10 is an example of a computing device according to the present invention. The ECU 10 is constituted by a computer which comprises CPU, memories to memorize various programs, and input/output devices. The ECU 10 executes various computation based on signals received from the above-described plural sensors, and outputs control signals to the engine control system 31, the brake control system 32, and the steering control system 33 for respective appropriate operations of these systems.

The ECU 10 executes computation for positioning on a traveling road based on traveling-road information. The traveling-road information is information on the traveling road where the vehicle 1 travels, which is acquired by the camera 21, the radar 22, the navigation system 30, and so on. The traveling-road information includes information on a shape of the traveling road (linear, curved, curvature), a width of the traveling road, the number of lanes, a lane width, and the like, for example.

FIG. 2 shows a state where the vehicle 1 travels on a traveling road 5. The ECU 10 sets plural virtual grid points Gn (n=1, 2, ... N) on the traveling road 5 which exists on a forward side, in an advancing direction, of the vehicle 1 by the computation based on the traveling-road information. When it is defined that a direction in which the traveling road 5 extends is an x direction and a width direction of the traveling road 5 is a y direction, the grid points Gn are arranged in a grid shape along the x direction and the y direction.

A range (area) where the ECU 10 sets the grid points Gn expands forwardly along the traveling road 5 over a distance L from the vehicle 1. This distance L is calculated based on a speed of the vehicle 1 during execution of the computation by the ECU 10. In the present embodiment, the distance L is set at a predicted distance (L=V×t) which the vehicle 1 travels at the speed (V) for a specified fixed time t (3 seconds, for example). However, this distance L may be set at a specified fixed distance (100 m, for example), or a function of a speed (and an acceleration). Further, a width W of the range where the grid points Gn are set is set at a value which is nearly equal to a width of the traveling road 5. Setting of the plural grid points Gn described above enables positioning on the traveling road 5.

Herein, the grid points Gn are arranged in a rectangular shape because the traveling road 5 shown in FIG. 2 is liner (straight). However, since the grid points Gn are arranged along an extension direction of the traveling road, in a case where the traveling road includes a curved section, the grid points Gn are arranged along curvature of the curved section.

Further, the ECU 100 executes computation for setting the route candidates RC (i.e., candidates of the target route for actual traveling of the vehicle 1) based on the traveling-road information and obstacle information. Herein, the obstacle information is information on an obstacle existing on the traveling road 5 located in front of the vehicle 1 (e.g., a preceding vehicle, a parked vehicle, a pedestrian, a dropped object, and the like), a moving direction of the obstacle, a moving speed of the obstacle, and so on, which is acquired by the camera 21 and the radar 22.

Moreover, the ECU 10 sets the plural route candidates RC by the route search using the State Lattice method. In the State Lattice method, the plural route candidates RC are set such that these branch off from the position of the vehicle 1 toward the grid points Gn located on a forward side, in the advancing direction, of the vehicle 1. FIG. 2 shows a part of the plural route candidates RC set by the ECU 10.

The ECU 10 selects one of the route candidates RC which has a minimum route cost based on a specified condition. Specifically, as shown in FIG. 2, the ECU 10 sets plural sampling points SP along each of the route candidates RC and calculates the route cost at each of the sampling points SP. Then, the ECU 10 selects one of the route candidates RC which has the minimum route cost and sets this selected route candidate RC as the target route.

Moreover, the ECU 10 outputs the control signals to the engine control system 31, the brake control system 32, and the steering control system 33 so that the vehicle 1 can travel along the target route set as described above.

The camera 21 is an example of a traveling-road information acquisition device according to the present invention and also an example of an obstacle information acquisition device according to the present invention. The camera 21 picks up images around the vehicle 1 and outputs data of the images picked up. The ECU 10 specifies objects (e.g., the preceding vehicle, the parked vehicle, the pedestrian, the traveling road, lanes (lane borders, white lines, yellow lines), traffic signals, traffic signs, stop lines, intersections, obstacles) based on the image data received from the camera 21. Herein, the ECU 10 may acquire information on the objects from outside by means of transportation infrastructure, inter-vehicle communication, or the like. Thereby, a kind of each object, a relative position of each object, a moving direction of each object, and others are specified.

The radar 22 is an example of the traveling-road information acquisition device according to the present invention and also an example of the obstacle information acquisition device according to the present invention. The radar 22 measures each position and speed of the objects (particularly, the preceding vehicle, the parked vehicle, the pedestrian, the dropped object on the traveling road 5, and the like). A millimeter-wave radar is usable as the radar 22, for example. The radar 22 transmits radio waves in the advancing direction of the vehicle 1 and receives reflected waves from the object. The radar 22 measures the distance between the vehicle 1 and the object (e.g., an inter-vehicle distance) or the relative speed of the object to the vehicle 1 based on the transmission waves and the reception waves. In the present embodiment, the above-described distance or relative speed may be measured by using a razor radar, a supersonic sensor, or the like in place of the radar 22. Further, a position and speed measuring device may be constituted by using plural sensors.

The vehicle speed sensor 23 detects an absolute speed of the vehicle 1. The acceleration sensor 24 detects an acceleration of the vehicle 1 (a longitudinal acceleration/deceleration, a lateral acceleration/deceleration). The yaw rate sensor 25 detects a yaw rate of the vehicle 1. The steering angle sensor 26 detects a rotational angle of a steering wheel (i.e., a steering angle) of the vehicle 1. The ECU 10 is capable of acquiring a yaw angle of the vehicle 1 (i.e., an angle of a longitudinal direction of the vehicle 1 relative to an x coordinate which will be described later) by executing specified computation based on the absolute speed detected by the vehicle speed sensor 23 and the steering angle detected by the steering angle sensor 26. The accelerator sensor 27 detects a pressing quantity of an accelerator. The brake sensor 28 detects a pressing quantity of a brake pedal.

The positioning system 29 is a GPS system and/or a gyro system and detects a position (location) of the vehicle 1 (i.e., present (current) vehicle-position information). The navigation system 30 stores map information therein and is capable of providing the map information to the ECU 10. The ECU 10 specifies roads, intersections, traffic signals, structures and others which exist around the vehicle 1 (in the advancing direction, particularly) based on the map information and the present vehicle-position information. The map information may be stored inside the ECU 10.

The engine control system 31 controls an engine of the vehicle 1. The ECU 10 outputs the control signal to the engine control system 31 in order to change an engine output in a case where the acceleration or deceleration of the vehicle 1 is necessary.

The brake control system 32 controls a brake device of the vehicle 1. The ECU 10 outputs the control signal to the brake control system 31 in order to generate a braking force in a case where the acceleration of the vehicle 1 is necessary.

The steering control system 33 controls a steering device of the vehicle 1. The ECU 10 outputs the control signal to the steering control system 33 in order to change a steering direction in a case where changing of the advancing direction of the vehicle 1 is necessary.

Figure 3:
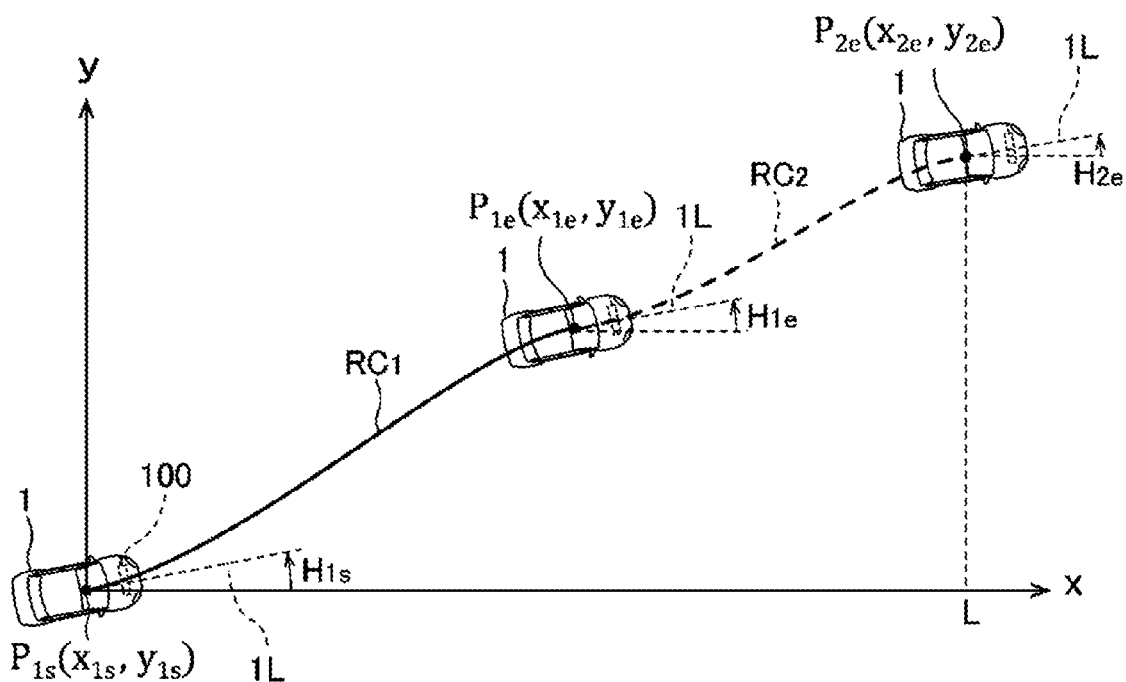
FIG. 3 is an explanatory diagram of the route candidates.
Figure 4:
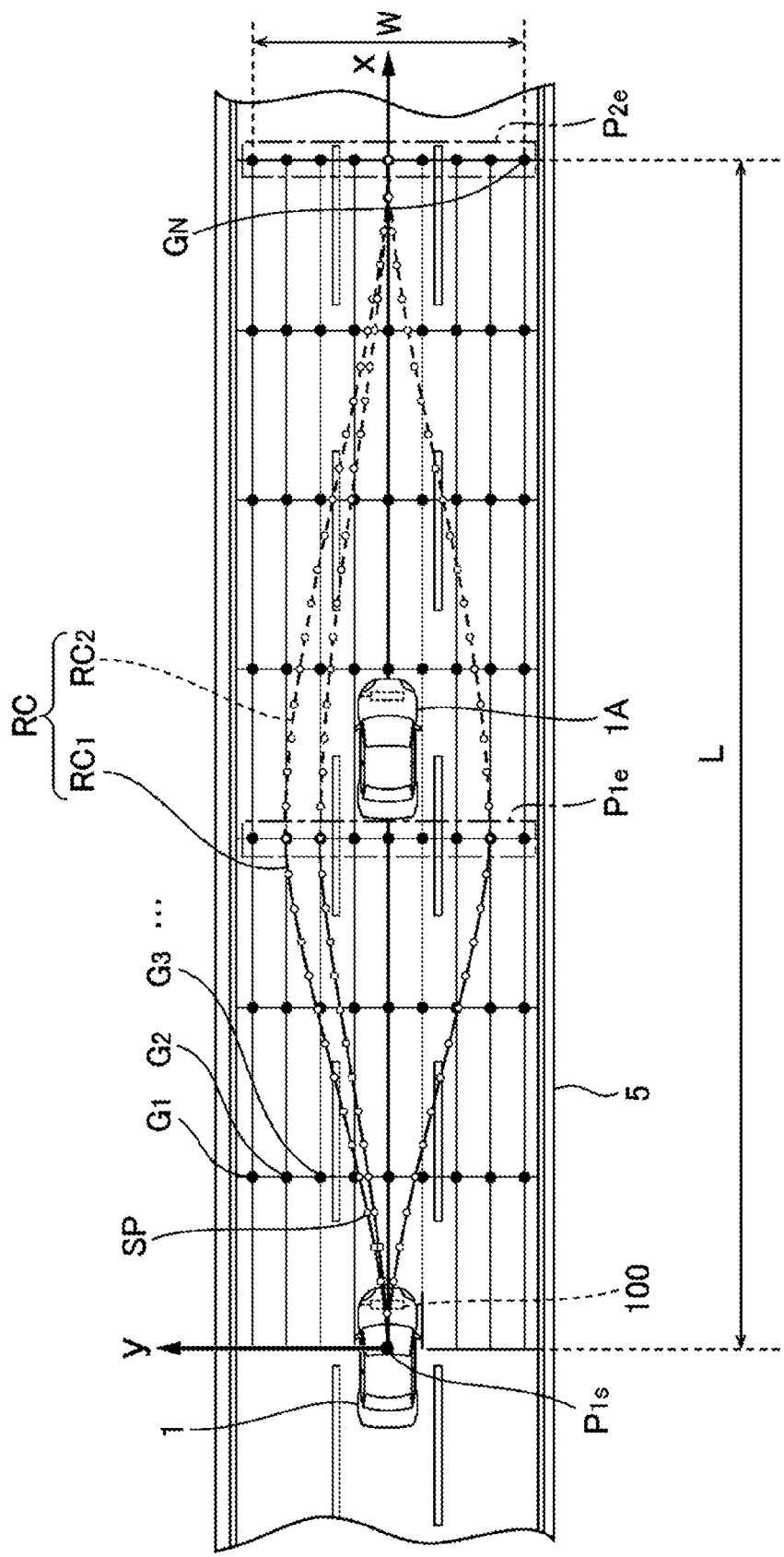
FIG. 4 is an explanatory diagram of the route candidates.

Next, the computation for setting the route candidates RC will be described referring to FIGS. 2-4. FIGS. 3 and 4 are explanatory diagrams of the route candidates RC. FIG. 2 shows the route candidates RC in a case where no obstacle exists on the traveling road 5 in the advancing direction of the vehicle 1. FIG. 4 shows the route candidates RC in a case where the obstacle exists on the traveling road 5 in the advancing direction of the vehicle 1.

Each of the route candidates RC comprises a first part $RC_1$ and a second part $RC_2$ as shown in FIGS. 2-4.

The first part $RC_1$ extends from a start point $P_{1s}$ up to a terminal point $P_{1e}$. The start point $P_{1s}$ is the position of the vehicle 1 during the execution of the computation. The start point $P_{1s}$ is represented by coordinates $(x_{1s}, y_{1s})$. In an example shown in FIGS. 2-4, since the vehicle 1 is located at the origin of the x, y coordinates, the coordinates of the start point $P_{1s}$ is (0, 0). The terminal point $P_{1e}$ is the grid point Gn which is specified by excluding a terminal point $P_{2e}$ (which will be described later) of the second part $RC_2$ from the plural grid points Gn. The coordinates of the terminal point $P_{1e}$ is represented by $(x_{1e}, y_{1e})$.

The second part $RC_2$ is continuous to the first part $RC_1$ at the terminal point $P_{1e}$ and extends up to its terminal point $P_{2e}$. That is, the terminal point $P_{1e}$ of the first part $RC_1$ is also the start point of the second part $RC_2$. The terminal point $P_{2e}$ is the grid point Gn among the plural grid points Gn which is located furthest from the vehicle 1 in the x direction. The coordinates of the terminal point $P_{2e}$ is represented by $(x_{2e}, y_{2e})$.

[Case where No Obstacle Exists]

First, the route candidates RC in a case where no obstacle exits on the traveling road 5 in the advancing direction of the vehicle 1 will be described. In this case, the ECU 10 sets all of the grid points Gn which are specified by excluding the plural grid points Gn furthest from the vehicle 1 in the x direction as the terminal points $P_{1e}$. The ECU 10 sets the first parts $RC_1$ extending from the start points $P_{1s}$ up to these set terminal points $P_{1e}$.

Next, the ECU 10 sets the plural grid points Gn furthest from the vehicle 1 in the x direction as the terminal points $P_{2e}$, and sets the second parts $RC_2$ extending from the terminal points $P_{1e}$ of the first parts $RC_1$ up to these set terminal points $P_{2e}$. The ECU 10 sets the curved lines comprising the first parts $RC_1$ and the second parts $RC_2$ as the route candidates RC.

<Setting of First Part $RC_1$>

The ECU 10 provisionally provides a quintic function having x coordinate as a variable and y coordinate as a curved line which is set as the first part $RC_1$ as shown in the following expression f1. The expression f1 is an example of a first function according to the present invention. The curved line which is plotted in the x, y coordinates based on the expression f1 is an example of a first curved line according to the present invention.

[formula 1]

$$y=a_1x^5+b_1x^4+c_1x^3+d_1x^2+e_1x+f_1 \tag{f1}$$

Herein, $a_1$-$f_1$ are unknown coefficients. It is necessary to decide the coefficients $a_1$-$f_1$ by solving at least six relational expressions in order to specifically provide the curved line extending from the start point up $P_{1s}$ up to the terminal point $P_{1e}$. Accordingly, the ECU 10 prepares the following expressions f2-f4 which are respectively obtained by first-order-third-order differentiations of the expression $f_1$.

[formula 2]

$$y'=5a_1x^4+4b_1x^3+3c_1x^2+2d_1x+e_1 \tag{f2}$$

$$y''=20a_1x^3+12b_1x^2+6c_1x+2d_1 \tag{f3}$$

$$y'''=60a_1x^2+24b_1x+6c_1 \tag{f4}$$

The coordinates $(x_{1s}, y_{1s})$ of the start point $P_{1s}$ and the coordinates $(x_{1e}, y_{1e})$ of the terminal point $P_{1e}$ meet the expression $f_1$, respectively. Accordingly, the ECU 10 is capable of obtaining the following relational expressions f5, f6.

[formula 3]

$$y_{1s}=a_1x_{1s}^5+b_1x_{1s}^4+c_1x_{1s}^3+d_1x_{1s}^2+e_1x_{1s}+f_1 \tag{f5}$$

$$y_{1e}=a_1x_{1e}^5+b_1x_{1e}^4+c_1x_{1e}^3+d_1x_{1e}^2+e_1x_{1e}+f_1 \tag{f6}$$

In the following description, an angle of a straight line 1L extending along the longitudinal direction of the vehicle 1 relative to the x coordinate as show in FIG. 3 will be referred to as the "yaw angle." Further, the yaw angle at the start point $P_{1s}$ is expressed by $H_{1s}$ and the yaw angle at the terminal point $P_{1e}$ of is expressed by $H_{1e}$. An unit of $H_{1s}$, $H_{1e}$ is radian.

The x coordinate $(x_{1s})$ of the start point $P_{1s}$ and a tangent of the yaw angle $H_{1s}$ at the start point $P_{1s}$ meet relationships of the expression f2. Further, the x coordinate $(x_{1e})$ of the terminal point $P_{1e}$ and a tangent of the yaw angle $H_{1e}$ at the terminal point $P_{1e}$ meet relationships of the expression f2 as well. Accordingly, the ECU 10 is capable of obtaining the following relational expressions f7, f8.

[formula 4]

$$\tan(H_{1s})=5a_1x_{1s}^4+4b_1x_{1s}^3+3c_1x_{1s}^2+2d_1x_{1s}+e_1 \tag{f7}$$

$$\tan(H_{1e})=5a_1x_{1e}^4+4b_1x_{1e}^3+3c_1x_{1e}^2+2d_1x_{1e}+e_1 \tag{f8}$$

Since the expression f3 represents a changing rate of y' to x, this expression f3 is correlated with a yaw angle speed. Accordingly, the x coordinate $(x_{1s})$ of the start point $P_{1s}$ and a yaw angle speed $K_{1s}$ at the start point $P_{1s}$ linearly meet relationships of the expression f3. Further, the x coordinate $(x_{1e})$ of the terminal point $P_{1e}$ and a yaw angle speed $K_{1e}$ at the terminal point $P_{1e}$ linearly meet relationships of the expression f3 as well. Accordingly, the ECU 10 is capable of obtaining the following relational expressions f9, f10.

[formula 5]

$$K_{1s}=20a_1x_{1s}^3+12b_1x_{1s}^2+6c_1x_{1s}2d_1 \tag{f9}$$

$$K_{1e}=20a_1x_{1e}^3+12b_1x_{1e}^2+6c_1x_{1e}+2d_1 \tag{f10}$$

Further, since the expression f4 represents a changing rate of y" to x, this expression f4 is correlated with a yaw angle acceleration. Accordingly, the x coordinate $(x_{1s})$ of the start point $P_{1s}$ and a yaw angle acceleration $K_{1s}'$ at the start point $P_{1s}$ linearly meet relationships of the expression f4. Further, the x coordinate $(x_{1e})$ of the terminal point $P_{1e}$ and a yaw angle acceleration $K_{1e}'$ a at the terminal point $P_{1e}$ linearly meet relationships of the expression f4 as well. Accordingly, the ECU 10 is capable of obtaining the following relational expressions f11, f12.

[formula 6]

$$K_{1s}'=60a_1x_{1s}^2+24b_1x_{1s}+6c_1 \tag{f11}$$

$$K_{1e}'=60a_1x_{1e}^2+24b_1x_{1e}+6c_1 \tag{f12}$$

The ECU 10 properly sets plural border conditions which represent respective states of the vehicle 1 (i.e., the coordinates, the yaw angle, the yaw angle speed, the yaw angle acceleration) at the start point $P_{1s}$ and the terminal point $P_{1e}$. The ECU 10 decides the coefficients $a_1$-$f_1$ by solving at least six relational expressions among the eight relational expressions f5-f12 with applications of these border conditions.

Thereby, the ECU 10 is capable of specifically providing the curved line set as the first part $RC_1$ which extends from the start point $P_{1s}$ up to the terminal point $P_{1e}$.

<Setting of Second Part $RC_2$>

The ECU 10 provisionally provides a cubic function having x coordinate as a variable and y coordinate as a curved line which is set as the second part $RC_2$ as shown in the following expression f13. The expression f13 is an example of a second function according to the present invention. The curved line which is plotted in the x, y coordinates based on the expression f13 is an example of a second curved line according to the present invention.

[formula 7]

$$y = a_2 x^3 + b_2 x^2 + c_2 x + d_2 \quad (f13)$$

Herein, $a_2$-$d_2$ are unknown coefficients. It is necessary to decide the coefficients $a_2$-$d_2$ by solving at least four relational expressions in order to specifically provide the curved line extending from the start point up $P_{1e}$ up to the terminal point $P_{2e}$. Accordingly, the ECU 10 prepares the following expressions f14, f15 which are respectively obtained by first-order and second-order differentiations of the expression f13.

[formula 8]

$$y' = 3a_2 x^2 + 2b_2 x + c_2 \quad (f14)$$

$$y'' = 6a_2 x + 2b_2 \quad (f15)$$

The coordinates $(x_{1e}, y_{1e})$ of the terminal point $P_{1e}$ and the coordinates $(x_{2e}, y_{2e})$ of the terminal point $P_{2e}$ meet the expression f13, respectively. Accordingly, the ECU 10 is capable of obtaining the following relational expressions f16, f17.

[formula 9]

$$y_{1e} = a_2 x_{1e}^3 + b_2 x_{1e}^2 + c_2 x_{1e} + d_2 \quad (f16)$$

$$y_{2e} = a_2 x_{2e}^3 + b_2 x_{2e}^2 + c_2 x_{2e} + d_2 \quad (f17)$$

Further, the x coordinate $(x_{1e})$ of the terminal point $P_{1e}$ and a tangent of the yaw angle $H_{1e}$ at the terminal point $P_{1e}$ meet relationships of the expression f14. Further, the x coordinate $(x_{2e})$ of the terminal point $P_{2e}$ and a tangent of the yaw angle $H_{2e}$ at the terminal point $P_{2e}$ meet relationships of the expression f14 as well. An unit of $H_{1e}$, $H_{2e}$ is radian. Accordingly, the ECU 10 is capable of obtaining the following relational expressions f18, f19.

[formula 10]

$$\tan(H_{1e}) = 3a_2 x_{1e}^2 + 2b_2 x_{1e} + c_2 \quad (f18)$$

$$\tan(H_{2e}) = 3a_2 x_{2e}^2 + 2b_1 x_{2e} + c_2 \quad (f19)$$

Further, since the expression f15 represents the changing rate of y' to x, this expression f15 is correlated with the yaw angle speed. Accordingly, the x coordinate $(x_{1e})$ of the start point $P_{1e}$ and a yaw angle speed $K_{1e}$ at the terminal point $P_{1e}$ linearly meet relationships of the expression f15. Further, the x coordinate $(x_{2e})$ of the terminal point $P_{2e}$ and a yaw angle speed $K_{2e}$ at the terminal point $P_{2e}$ linearly meet relationships of the expression f15 as well. Accordingly, the ECU 10 is capable of obtaining the following relational expressions f20, f21.

[formula 11]

$$K_{1e} = 6a_2 x_{1e} + 2b_2 \quad (f20)$$

$$K_{2e} = 6a_2 x_{2e} + 2b_2 \quad (f21)$$

The ECU 10 properly sets plural border conditions which represent respective states of the vehicle 1 (i.e., the coordinates, the yaw angle, the yaw angle speed) at the terminal point $P_{1e}$ and the terminal point $P_{2e}$. The ECU 10 decides the coefficients $a_2$-$d_2$ by solving at least four relational expressions among the six relational expressions f16-f21 with applications of these border conditions. Thereby, the ECU 10 is capable of specifically providing the curved line set as the second part $RC_2$ which extends from the terminal point $P_{1e}$ up to the terminal point $P_{2e}$.

[Case where Obstacle Exists]

Next, the route candidate RC in a case where an obstacle exists on the traveling road 5 in the advancing direction of the vehicle 1 will be described. FIG. 4 shows a case where a preceding vehicle 1A as the obstacle exists on the traveling road 5 in the advancing direction of the vehicle 1.

This case is the same as the above-described case where no obstacle exists in terms of the route candidate RC comprising the first part $RC_1$ set by using the quintic function and the second part $RC_2$ set by using the cubic function. The case is, however, different from the case where no obstacle exists in terms of the grid points Gn which are set as the terminal points $P_{1e}$ of the first parts $RC_1$ being limited.

Specifically, as shown in FIG. 4, in the case where the preceding vehicle 1A exists in a range where the grid points Gn are set, the ECU 10 does not provide any curved line having the terminal point $P_{1e}$ which corresponds to the grid point Gn which is located on the forward side, in the advancing direction of the vehicle 1, of the preceding vehicle 1A and any curved line having the start point which corresponds to this grid point Gn. Thus, the route candidate RC which comprises the first part $RC_1$ having the terminal point $P_{1e}$ which corresponds to the grid point Gn located on the forward side, in the advancing direction of the vehicle 1, of the preceding vehicle 1A and the second part $RC_2$ having the start point which corresponds to this grid point Gn is not set.

More specifically, the ECU 10 provides only the curved line having the terminal point $P_{1e}$ which corresponds to the grid point Gn located in the vicinity of the preceding vehicle 1A and the curved line having the start point which corresponds to this grid point Gn in the case where the preceding vehicle 1A exists in the range where the grid points Gn are set. Accordingly, the route candidate RC comprising the first part $RC_1$ having the terminal point $P_{1e}$ which corresponds to the grid point Gn located in the vicinity of the preceding vehicle 1A and the second part $RC_2$ having the start point which corresponds to this grid point Gn is set only.

Figure 5:
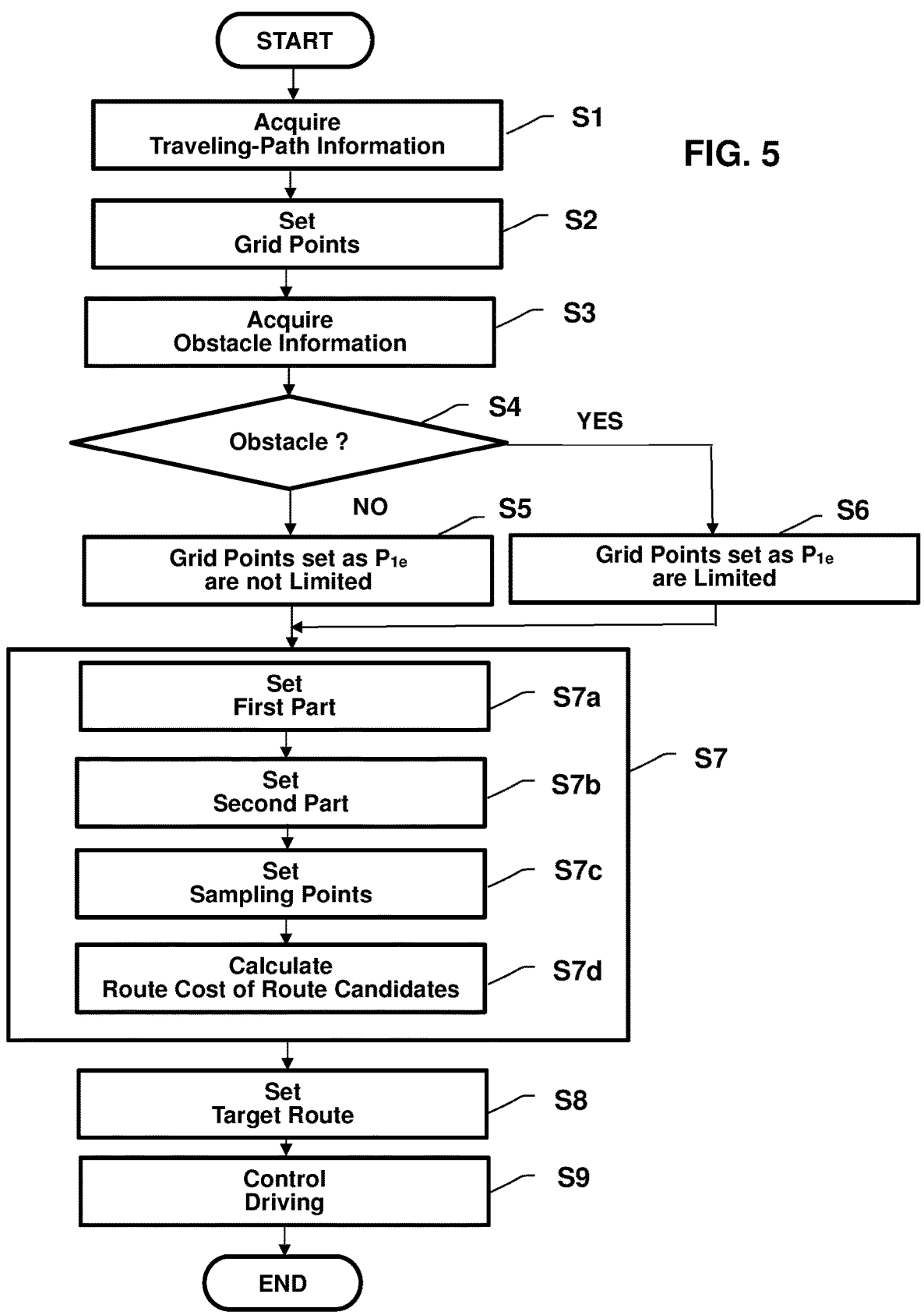
FIG. 5 is a flowchart showing computation executed by an ECU shown in FIG. 1.

Next, the computation executed by the ECU 10 in the driving support control will be described referring to FIG. 5. FIG. 5 is a flowchart showing the computation executed by the ECU 10. The ECU 10 executes the computation shown in FIG. 5 repeatedly (e.g., at every 0.05-0.2 sec.).

First, the ECU 10 acquires the traveling-road information from the camera 21, the radar 22, and the navigation system 30 in step S1.

Next, in step S2, the ECU 10 specifies the shape of the traveling road 5 (e.g., an extension direction of the traveling road 5, a width of the traveling road 5) and sets the plural grid points Gn (n=1, 2, ... N) on the traveling road 5. The ECU 10 sets the grid points Gn every 10 m in the x direction and every 0.875 m in the y direction, for example.

Then, in step S3, the ECU 10 acquires the obstacle information from the camera 21 and the radar 22. That is, the ECU 10 acquires information on the obstacle existing on the traveling road 5 located in front of the vehicle 1, the moving direction of the obstacle, the moving speed of the obstacle, and so on.

Next, in step S4, the ECU 10 determines whether the obstacle exists on the traveling road 5 in the advancing direction of the vehicle 1. Specifically, the ECU 10 determines whether the preceding vehicle, the parked vehicle, the pedestrian or the like exist in the range where the grid points Gn are set based on the obstacle information acquired in the step S3. In a case where it is determined that no obstacle exists on the traveling road 5 in the advancing direction of the vehicle 1 (NO: in the step S4), the ECU 10 proceeds to step S5.

Then, in the step S5, the ECU 10 decides that the grid points Gn which are set as the terminal points $P_{1e}$ of the first parts $RC_1$ of the route candidate RC are not limited. That is, the ECU 10 sets all of the grid points Gn which are specified by excluding the plural grid points Gn furthest from the vehicle 1 in the x direction as the terminal points $P_{1e}$ as shown in FIG. 2.

A step S7 includes setting of the route candidates RC (steps S7a, S7b), setting of the sampling points SP (step S7c), and calculation of the route cost of each of the route candidates RC (step S7d).

In the step S7a, the ECU 10 sets the first part $RC_1$ extending from the start point $P_{1s}$ up to the all of the grid points Gn set as the terminal point $P_{1e}$. The start point $P_{1s}$ is the position of the vehicle 1 during the execution of the computation as described above.

Then, in the step S7b, the ECU 10 sets the second parts $RC_2$ extending from the terminal points $P_{1e}$ of the first parts $RC_1$ up to the all of the grid points Gn set as the terminal points $P_{2e}$. The terminal points $P_{2e}$ are the plural grid points Gn furthest from the vehicle 1 in the x direction as described above.

The plural first parts $RC_1$ are set in the step S7a, and the plural second parts $RC_2$ continuous from the first parts $RC_1$ are set in the step S7b. The many route candidates RC are set on the traveling road 5 by these plural first and second parts $RC_1$, $RC_2$ being set.

Next, in the step S7c, the ECU 10 sets the plural sampling points SP (see FIG. 2). The sampling points SP are set at regular intervals (e.g., every 0.2 m) in the x direction along the route candidates RC set in the steps S7a, S7b.

Subsequently, in the step S7d, the ECU 10 calculates the route cost at each of the sampling points SP of the route candidates RC. The route cost includes costs related to the speed, the acceleration, the lateral acceleration, the route changing rate, the obstacle, and so on. These costs can be properly set. Schematically, the route cost includes a traveling cost and a safety cost. For example, in a case where the vehicle travels on the liner (straight) route, the traveling cost is small because of a short traveling distance. In a case where the vehicle travels on a route to avoid the obstacle or the like, however, the traveling cost is relatively large because the traveling distance is longer. Further, the traveling const increases as the lateral acceleration becomes large.

The ECU 10 stores the largest traveling cost among the route costs calculated for the sampling points SP of the route candidates RC in a memory, not illustrated, as the route cost of the route candidates RC.

The ECU 10 executes the calculation of the step S7 for all of the plural grid points Gn set as the terminal points $P_{1e}$ in the step S5.

Next, in step S8, the ECU 10 sets the target route. Specifically, the ECU 10 selects the route candidate RC having the smallest route cost, and sets this route candidate RC as the target route.

Then, in step S9, the ECU 10 outputs the control signals to the engine control system 31, the brake control system 32, and the steering control system 33 so that the vehicle 1 can travel along this target route.

Meanwhile, in a case where it is determined in the step S4 that the obstacle exists on the traveling road 5 in the advancing direction of the vehicle 1 (YES: in the step S4), the ECU 10 proceeds to step S6.

In the step S6, the ECU 10 decides that the grid points Gn which are set as the terminal points $P_{1e}$ of the first parts $RC_1$ of the route candidate RC are limited. That is, the ECU 10 sets only the grid points Gn located in the vicinity of the preceding vehicle 1A as the obstacle as the terminal points $P_{1e}$ as shown in FIG. 4.

In this case, the ECU 10 executes the calculation of the step S7 for all of the plural grid points Gn set as the terminal points $P_{1e}$ in the step S6. Herein, the total number of the route candidates RC set in the steps S7a, S7b is less than that of the route candidates RC in the case where no obstacle exists on the traveling road 5 in the advancing direction of the vehicle 1 (NO: in the step S4). Thereby, the computing load of the ECU 10 is reduced.

Further, in the case where it is determined that the obstacle exists on the traveling road 5 in the advancing direction of the vehicle 1 (YES: in the step S4), the total number of the route candidates RC set in the step S7c is also less than that of the route candidates RC in the case where no obstacle exists on the traveling road 5 in the advancing direction of the vehicle 1 (NO: in the step S4). Accordingly, the load of calculation of the route cost in the step S7d is reduced.

Hereafter, the operation of the driving support system 100 of the present embodiment will be described.

According to the present system, the ECU 10 as the computing device sets the first curved line as the route candidate RC for the close range which is positioned relatively closely to the vehicle 1 and sets the second curved line as the route candidate RC for the far range which is far from the close range. While the first curved line represented by the quintic function can set the precise route candidate RC which is capable of meeting many requirements, the computing load in providing the first curved line is large. Meanwhile, the second curved line represented by the cubic function having the relatively low degree does not cope with many requirements like the first curved line, but the computing load in providing the second curved line is properly small. The ECU 10 can reduce the computing load in setting the route candidate RC by setting the second curved line as part of the route candidate RC.

Herein, in a case where the obstacle exists on the traveling road 5, it is preferable that the route candidate RC for a range from the vehicle 1 to the obstacle be set precisely by the first curved line so that various requirements, such as vehicle's collision avoidance with the obstacle or less discomfort that passengers may feel in operation for this vehicle's collision avoidance, can be met. Meanwhile, the route candidate RC for a range which is far from the obstacle does not require such precise setting like the route candidate RC for the range from the vehicle 1 to the obstacle.

Thus, according to the present system, in the case where the obstacle is detected by the camera 21 and the radar 22, the ECU 10 does not provide the first curved line having the terminal point $P_{1e}$ which corresponds to the grid point Gn located on the forward side, in the advancing direction of the vehicle 1, of the obstacle and the second curved line having the start point which corresponds to this grid point Gn. Thereby, the present system can properly reduce the computing load in setting the route candidates RC, meeting the requirements, such as vehicle's collision avoidance with the obstacle or less discomfort that passengers may feel in operation for this vehicle's collision avoidance.

Further, the ECU 10 provides only the first curved line having the terminal point $P_{1e}$ which corresponds to the grid point Gn located in the vicinity of the obstacle and the second curved line having the start point which corresponds to this grid point Gn in the case where the obstacle is detected by the camera 21 and the radar 22. The present system can more properly reduce the computing load in setting the route candidates, meeting the requirements, such as vehicle's collision avoidance with the obstacle or less discomfort that passengers may feel in operation for this vehicle's collision avoidance.

Herein, the first function is the quintic function having the x coordinate as the variable. According to the present system, the relational expressions correlated with the yaw angle, the yaw angle speed, and the yaw angle acceleration of the vehicle 1 can be respectively obtained by first-order-third-order differentiations of the quintic function with the x coordinate. The yaw angle, the yaw angle speed and the yaw angle acceleration of the vehicle 1 can be evaluated by these relational expressions. Consequently, the present system can set the route candidates RC to reduce the discomfort that passengers may feel, considering behavior of the vehicle 1 in a yaw direction.

Meanwhile, the second function is the cubic function having the x coordinate as a variable. According to the present system, the relational expressions correlated with the yaw angle and the yaw angle speed of the vehicle can be respectively obtained by first-order and second-order differentiations of the cubic function with the x coordinate. The yaw angle and the yaw angle speed of the vehicle can be evaluated by these relational expressions. Consequently, the present system can set the route candidates RC to reduce the discomfort that passengers may feel, considering the behavior of the vehicle 1 in the yaw direction.

While the embodiment of the present invention has been described referring to the specific examples, the present invention should not be limited to the above-described examples and any other modifications or improvements may be applied within the scope of a spirit of the present invention.

What is claimed is:

1. A route candidate setting system for setting candidates of a traveling route of a vehicle, comprising:
 a traveling-road information acquisition device to acquire traveling-road information on a traveling road of the vehicle;
 an obstacle information acquisition device to acquire obstacle information on an obstacle existing on the traveling road; and
 a computing device to execute computation for setting the candidates of the traveling route of the vehicle based on the traveling-road information acquired by the traveling-road information acquisition device and the obstacle information acquired by obstacle information acquisition device,
 wherein said computing device is configured, when it is defined that a direction in which the traveling road extends is an x direction and a width direction of the traveling road is a y direction, to:
  set plural grid points arranged in a grid shape on the traveling road;
  provide a first curved line and a second curved line, the first curved line being configured to extend from a start point thereof which corresponds to a position of the vehicle during execution of the computation by the computing device up to a terminal point thereof which corresponds to a grid point located on a forward side, in an advancing direction, of the vehicle and be represented by a first function having x coordinate as a variable and y coordinate, the second curved line being configured to extend from a start point thereof which corresponds to the terminal point of said first curved line up to a terminal point thereof which corresponds to another grid point located on the forward side, in the advancing direction of the vehicle, of the start point thereof and be represented by a second function having x coordinate as a variable and y coordinate, wherein a degree of said second function is lower than that of said first function; and
  set said first curved line and said second curved line as said candidate of the traveling route of the vehicle,
  wherein in a case where the obstacle is detected by said obstacle information acquisition device, said computing device is configured not to provide the first curved line having the terminal point which corresponds to the grid point located on the forward side, in the advancing direction of the vehicle, of the obstacle and the second curved line having the start point which corresponds to said grid point.

2. The route candidate setting system of claim 1, wherein said computing device is configured to provide only the first curved line having the terminal point which corresponds to the grid point located in the vicinity of the obstacle and the second curved line having the start point which corresponds to said grid point in the case where the obstacle is detected by the obstacle information acquisition device.

3. The route candidate setting system of claim 2, wherein said first function is a quintic function having x coordinate as a variable.

4. The route candidate setting system of claim 3, wherein said second function is a cubic function having x coordinate as a variable.

5. A route candidate setting method for setting candidates of a traveling route of a vehicle, comprising steps of:
 acquiring traveling-road information on a traveling road of the vehicle;
 acquiring obstacle information on an obstacle existing on the traveling road; and
 executing computation for setting the candidates of the traveling route of the vehicle based on the traveling-road information and the obstacle information,
 wherein said step of executing the computation includes, when it is defined that a direction in which the traveling road extends is an x direction and a width direction of the traveling road is a y direction, steps of:
 setting plural grid points on the traveling road;
 providing a first curved line and a second curved line, the first curved line being configured to extend from a start point thereof which corresponds to a position of the vehicle during execution of the computation up to a terminal point thereof which corresponds to a grid point located on a forward side, in an advancing direction, of the vehicle and be represented by a first function having x coordinate as a variable and y coordinate, the second curved line being configured to extend from a start point thereof which corresponds to the terminal point of said first curved line up to a terminal point thereof which corresponds to another grid point located on the forward side, in the advancing direction of the vehicle, of the start point thereof and be represented by a second function having x coordinate as a variable and y coordinate, wherein a degree of said second function is lower than that of said first function; and setting said first curved line and said second curved line as said candidate of the traveling route of the vehicle, wherein in a case where the obstacle is detected, said step of executing the computation is configured not to provide the first curved line having the terminal point which corresponds to the grid point located on the forward side, in the advancing direction of the vehicle, of the obstacle and the second curved line having the start point which corresponds to said grid point.

* * * * *